(12) United States Patent
Warkentin et al.

(10) Patent No.: US 9,952,887 B2
(45) Date of Patent: Apr. 24, 2018

(54) DEVICE SIMULATION IN A SECURE MODE SUPPORTED BY HARDWARE ARCHITECTURES

(71) Applicant: VMware, Inc., Palo Alto, CA (US)

(72) Inventors: Andrei Warkentin, Wakefield, MA (US); Harvey Tuch, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 27 days.

(21) Appl. No.: 14/312,249

(22) Filed: Jun. 23, 2014

(65) Prior Publication Data

US 2015/0371036 A1 Dec. 24, 2015

(51) Int. Cl.
*G06F 7/04* (2006.01)
*G06F 9/455* (2018.01)
*G06F 21/74* (2013.01)

(52) U.S. Cl.
CPC ...... *G06F 9/45516* (2013.01); *G06F 9/45533* (2013.01); *G06F 21/74* (2013.01)

(58) Field of Classification Search
CPC .. G06F 21/74; G06F 12/1433; G06F 12/1466; G06F 21/554; G06F 21/79; G06F 2221/2101; G06F 12/1491; G06F 2009/45575; G06F 2009/45579; G06F 2009/45587; G06F 21/00; G06F 21/31; G06F 21/53; G06F 21/54; G06F 2221/2105; G06F 9/45558; G06F 9/462; G06F 12/1081; G06F 12/00; G06F 12/0284; G06F 12/0802; G06F 12/0862; G06F 12/10; G06F 12/1009; G06F 13/28; G06F 2009/45583; G06F 9/45533; G06F 9/50; G06F 9/45516; H04L 67/125
USPC .......................................................... 726/16
See application file for complete search history.

(56) References Cited

U.S. PATENT DOCUMENTS

| | | | | |
|---|---|---|---|---|
| 5,805,867 A * | 9/1998 | Kodaira | ................ | G06F 11/261 703/21 |
| 2004/0177261 A1* | 9/2004 | Watt | .................... | G06F 9/30181 713/193 |
| 2004/0254779 A1* | 12/2004 | Wang | .................... | G06F 11/261 703/27 |
| 2008/0250216 A1* | 10/2008 | Kershaw | ................ | G06F 9/322 711/163 |
| 2013/0339628 A1* | 12/2013 | Alexander | .............. | G06F 12/00 711/144 |
| 2014/0173275 A1* | 6/2014 | Johnson | ................... | H04L 9/00 713/161 |
| 2014/0283006 A1* | 9/2014 | Korkishko | .............. | G06F 21/53 726/16 |

* cited by examiner

*Primary Examiner* — Abiy Getachew
(74) *Attorney, Agent, or Firm* — Patterson & Sheridan, LLP

(57) ABSTRACT

A secure mode of a computer system is used to provide simulated devices. In operation, if an instruction executing in a non-secure mode accesses a simulated device, then a resulting exception is forwarded to a secure monitor executing in the secure mode. Based on the address accessed by the instruction, the secure monitor identifies the device and simulates the instruction. The secure monitor executes independently of other applications included in the computer system, and does not rely on any hardware virtualization capabilities of the computer system.

17 Claims, 5 Drawing Sheets

DEVICE SIMULATION IN A SECURE MODE SUPPORTED BY HARDWARE ARCHITECTURES

BACKGROUND

Device simulation is used in computers system to mimic the behavior of missing or incompatible devices. In one approach to simulating devices, a hypervisor that supports execution of virtual machines (VMs) also performs device simulation. In such systems, if a VM attempts to access a device, such as a serial port, then the hypervisor traps the access and simulates the device. However, other computer systems may not include hypervisors because a hypervisor is not running or the hardware does not have a hypervisor mode, or the hypervisor itself requires the use of a simulated device. Consequently, a more general and flexible approach to simulating devices in computer systems with or without hypervisors is desirable.

SUMMARY

One or more embodiments provide techniques to provide simulated devices in a computer system operable in both a secure operating mode and a non-secure operating mode. A method of simulating a device according to an embodiment includes the steps of receiving an exception caused by a non-secure instruction, and in response, executing secure operations to determine a memory address accessed by the non-secure instruction; determining that the memory address is included in a set of memory addresses associated with the device; and performing secure simulation operations based on the non-secure instruction.

DETAILED DESCRIPTION

Figure 1:
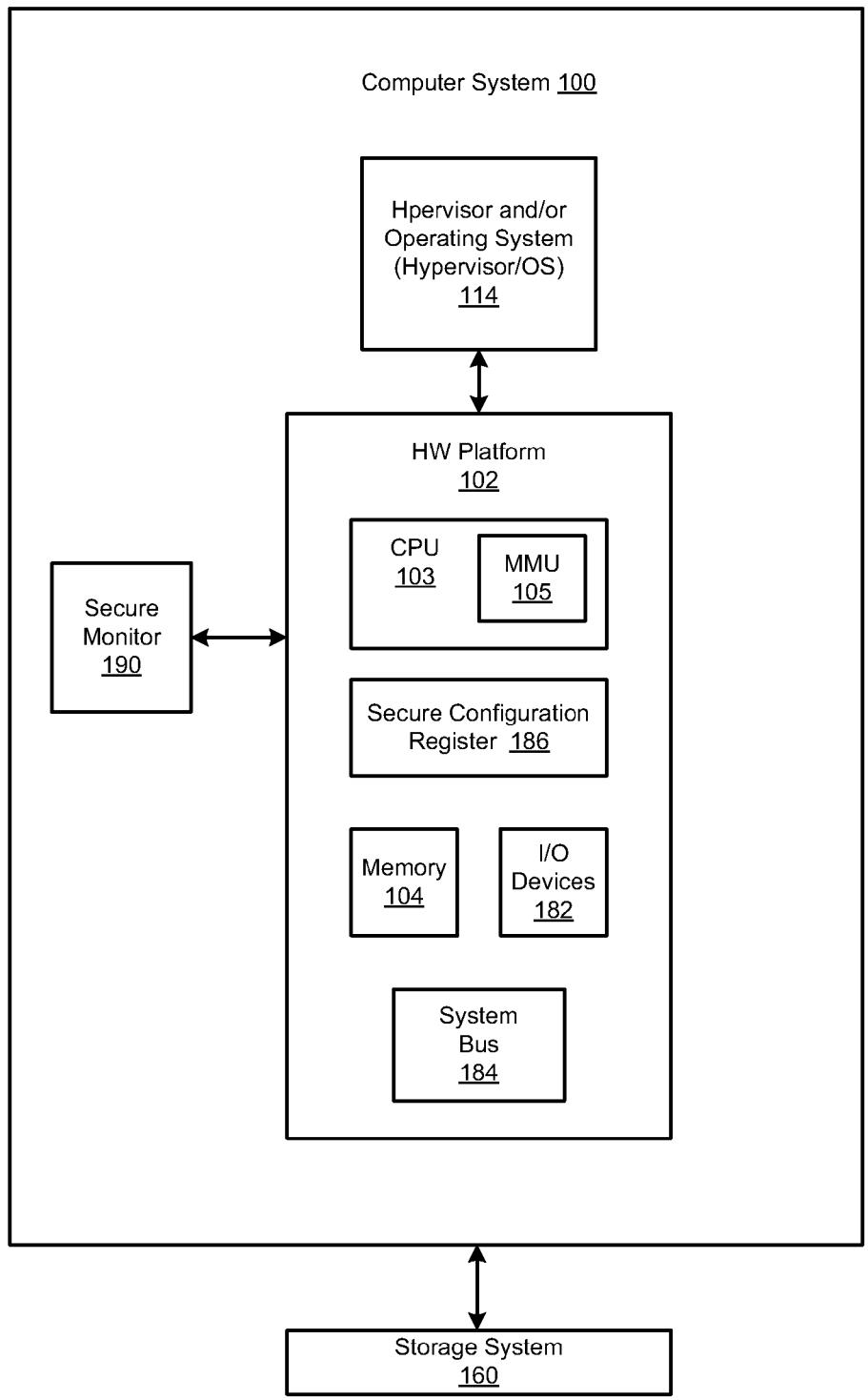
FIG. 1 is a block diagram of a computer system that is configured to simulate devices according to one or more embodiments.

FIG. 1 is a block diagram of a computer system that is configured to simulate devices according to one or more embodiments. Computer system 100 may be constructed on a desktop, laptop or server grade hardware platform 102, such as a 64-bit ARM® server. As shown, hardware platform 102 includes, inter alia, one or more central processing units (CPU) 103, memory 104, and devices 182. Within hardware platform 102, any number and combination of units, such as CPU 103 and memory 104, are coupled via system bus 184. Hardware platform 102 also includes other standard hardware components such as network interface controllers (not shown) that connect computer system 100 to a network and one or more bus adapters (not shown) that connect computer system 100 to a persistent storage device, illustrated herein as storage system 160.

Hardware platform 102 operates in one of two distinct modes: a secure mode and a non-secure mode. Many advanced hardware platforms provide mechanisms to invoke trusted execution environments, such as the secure mode, to protect assets from software and hardware attack. However, the implementation details of the hardware platform and interfaces to the secure operating mode often differ across vendors and architectures. It should be recognized that the techniques described herein are illustrative rather than restrictive.

A secure configuration register 186 included in hardware platform 102 indicates whether hardware platform 102 is operating in secure mode or non-secure mode. The scope of this operating mode extends across hardware platform 102, encompassing CPU 103 and other components such as devices 182 and system bus 184. Notably, software executing on CPU 103 in secure mode is independent of software executing on CPU 103 in non-secure mode. Further, software running in secure mode has more extensive access and privileges with respect to hardware platform 102 than software running in non-secure mode. For instance, hardware platform 102 enables software running in secure mode to respond to certain exceptions, such as external abort exceptions. By contrast, hardware platform 102 precludes software running in non-secure mode to generate effective responses to external abort exceptions.

An exemplary computer system 100 that may implement this method includes an ARM® Cortex®-A57 (based on the ARM®v8 architecture) CPU 103. The ARM® Cortex®-A57 supports TrustZone security extensions that provide both non-secure and secure modes of operation. The ARM® Cortex®-A57 is commercially available from ARM Holdings of Cambridge, United Kingdom. It should be recognized that the techniques described herein are illustrative rather than restrictive. In particular, alternate embodiments include any CPU 103 that supports two independent modes of operation that may be leveraged in a similar fashion to the disclosed techniques.

In conventional usage, secure mode is used to mitigate security concerns (e.g., confidentiality, integrity, authenticity, etc.). Advantageously, in hardware platform 102, a secure monitor 190 is a software module installed on top of hardware platform 102 to execute in secure mode, so that it can exploit capabilities unavailable in non-secure mode and provide device simulation capability. In one embodiment, secure monitor 190 operates transparently to a hypervisor and/or operating system (hypervisor/OS) 114. In operation, secure monitor 190 responds to memory accesses to "simulated" devices that are not backed by hardware platform 102, generating appropriate responses transparently to non-secure units and non-secure software executing in hardware platform 102. Further, unlike many conventional approaches to simulation, secure monitor 190 does not rely on hardware virtualization capabilities of CPU 103. It should be recognized that the techniques disclosed herein may be extended to other computer systems that enable a secure and non-secure operating mode.

Hypervisor/OS 114 is also installed on top of hardware platform 102, and CPU 103 executes hypervisor/OS 114 in non-secure mode. Notably, secure monitor 190 supports device simulation for programs executing in non-secure mode on hardware platform 102, such as hypervisor/OS 114. One example of a hypervisor that may be used is included as component of VMware® vSphere™, and one example of an operating system is the Linux OS. It should be recognized that the various terms, layers and categorizations used to describe the components in FIG. 1 may be referred to or arranged differently. It should further be recognized that other computer systems are contemplated, such as hosted virtual machine systems, where a hypervisor is implemented in conjunction with an operating system.

CPU 103 has a memory management unit (MMU) 105 that carries out the mappings from virtual addresses into physical addresses. If a virtual address unmapped by MMU 105 is accessed, then a page fault is issued. If a physical address is not backed by hardware platform 102, then an "external abort" is issued. To facilitate device simulation, accesses to physical addresses that are not backed by memory 104 or physical devices are configured to trap into secure monitor 190. Subsequently, if secure monitor 190 determines that the accessed address range does not correspond to a simulated device, then secure monitor 190 reflects an invalid access to hypervisor/OS 114 that initiated the associated non-secure instruction. By contrast, if secure monitor 190 determines that the accessed address range corresponds to a simulated device, then secure monitor 190 responds to the associated non-secure instruction, mimicking the expected behavior.

To enable secure monitor 190 to correctly identify the non-secure instruction that corresponds to each access to a simulated device, accesses to the address ranges for which secure monitor 190 provides simulated devices are performed synchronously with the non-secure instructions. More specifically, accesses to such address ranges are performed without any reordering, buffering, or caching. Specifying memory access patterns in such a manner may be done in any technically feasible fashion, such as configuring page table entry flags in MMU 105.

Figure 2A:
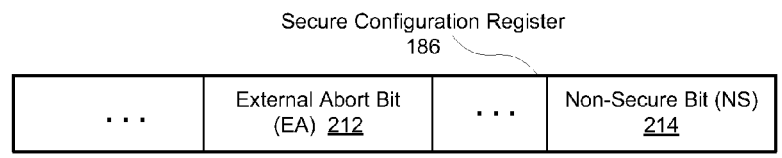
FIGS. 2A and 2B are conceptual diagrams that illustrate a secure configuration register, a non-secure mode, and a secure mode according to one or more embodiments.
Figure 2B:
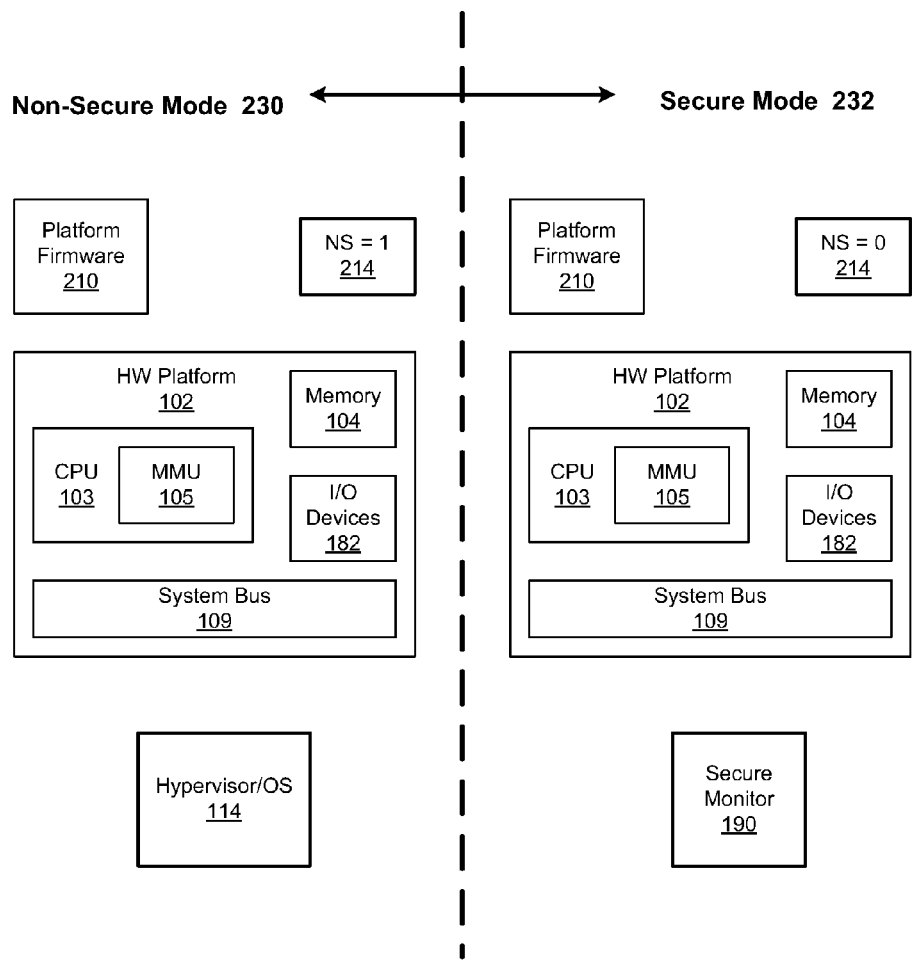

FIGS. 2A and 2B are conceptual diagrams that illustrate a secure configuration register 186, a non-secure mode 230, and a secure mode 232, according to one or more embodiments. Secure configuration register 186 defines the current state of CPU 103, including whether CPU 103 is executing software in non-secure mode 230 or secure mode 232. Secure configuration register 186 operates in conjunction with any number (including zero) of other registers included in hardware platform 102 to define execution flow upon external abort exceptions. As is well known in the art, CPU 103 generates an external abort exception in response to an attempted access to an address in memory 104 that is not backed by any hardware included in hardware platform 102, such as an address that lies within a simulated region.

As shown in FIG. 2A, secure configuration register 186 includes, inter alia, a non-secure bit (NS) 214 and an external abort bit (EA) 212. If non-secure bit 214 is set (i.e., equals 1), then hardware platform 102 is in non-secure mode 230. If non-secure bit 214 is clear (i.e., equals 0), then hardware platform 102 is in secure mode 232. External abort bit 212 dictates execution flow following an external abort exception. If external abort 212 is set, then an external abort exception is processed by a default hypervisor/OS external abort handler. Advantageously, if external abort 212 is clear, then an external abort exception is processed by a secure mode external abort handler executing in secure mode 232.

The left side of FIG. 2B depicts hardware platform 102 in non-secure mode 230, whereas the right side of FIG. 2B depicts hardware platform 102 in secure mode 232. The two sides of FIG. 2B are shown separated by a dotted line. As shown in FIG. 2A, external abort bit 212 and non-secure bit 214 are included in secure configuration register 186. In FIG. 2B, for explanatory purposes only, non-secure bit 214 is displayed independently of secure configuration register 186. External abort 212 is clear in both non-secure mode 230 and secure mode 232. By contrast, non-secure bit 214 is set in non-secure mode 230 and is clear in secure mode 232.

Upon power-up of hardware platform 102, a platform firmware 210 executes in secure mode 232 and then transitions hardware platform 102 to non-secure mode 230. As part of the power-up process, platform firmware 210 performs various initializations functions such as installing security measures, installing hypervisor/OS 114, and installing secure monitor 190. In various embodiments, the functionality of platform firmware 210, hypervisor/OS 114, and/or secure monitor 190 may be consolidated into a single unit or distributed into additional units. During initialization, platform firmware 210 configures secure configuration register 186 and any number of other registers to forward external abort exceptions generated in non-secure mode 230 to secure monitor 190 executing in secure mode 232.

Hypervisor/OS 114 executes in non-secure mode 230. By contrast, secure monitor 190 executes in secure mode 232, receiving forwarded external abort exceptions and providing simulation for those external abort exceptions intended for simulated devices without leveraging hardware virtual capabilities. Further, hypervisor/OS 114 and secure monitor 190 execute independently of each other. Consequently, both hypervisor/OS 114 and secure monitor 190 may effectively operate within hardware architectures such as ARM®v7 and ARM®v8.

Figure 3A:
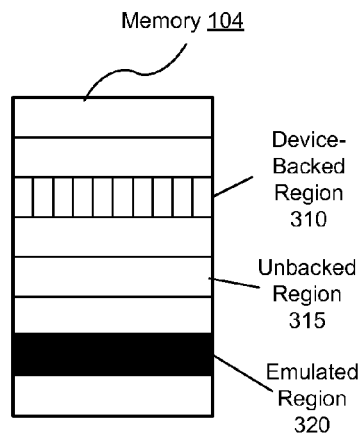
FIGS. 3A and 3B are conceptual diagrams that illustrate mapping and simulating devices according to one or more embodiments.
Figure 3B:
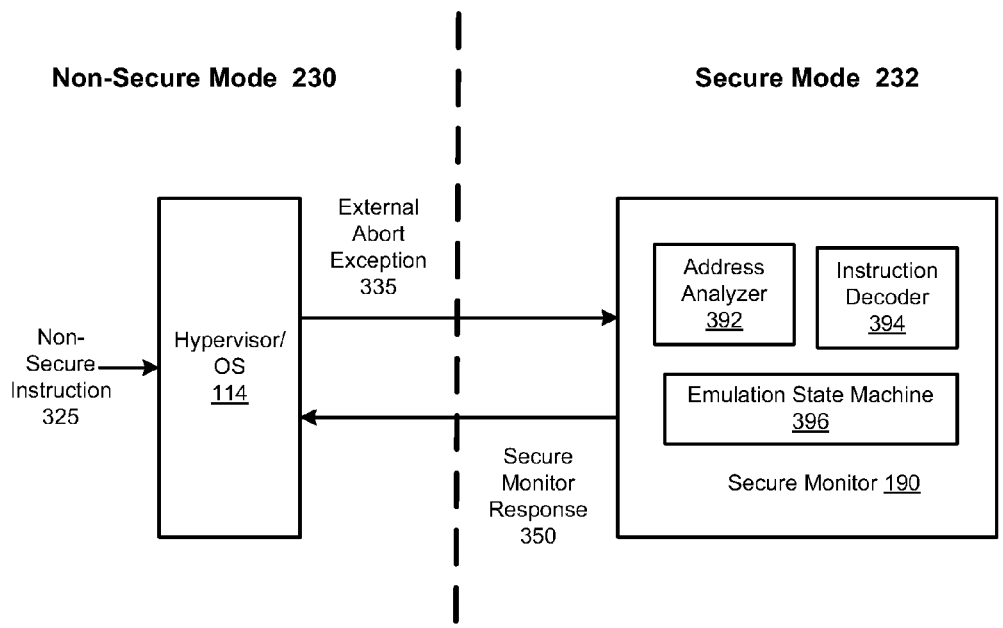

FIGS. 3A and 3B are conceptual diagrams that illustrate mapping and simulating devices according to one or more embodiments. As shown in FIG. 3A, memory 104 includes a device-backed region 310, an unbacked region 315, and a simulated region 320. In general, memory 104 may include any number of device-backed regions 310, unbacked regions 315, and/or simulated regions 320. Further, each region in memory 104 may include any number of addresses. Device-backed region 310 and simulated region 320 are depicted as consecutive ranges of addresses, organized into frames. However, it should be understood that each region, such as simulated region 320, may include as few as one address. Further, some embodiments may not include any device-backed regions 310 and/or unbacked regions 315.

In general, device-backed regions 310 correspond to memory 104 that is properly backed by hardware included in hardware platform 102. For instance, an address in device-backed region 310 may correspond to a particular device 182 that is a physical unit within hardware platform 102. By contrast, an address in unbacked region 315 corresponds to memory 104 that is not backed by hardware included in hardware platform 102 and not simulated by secure monitor 190. An address in simulated region 320 corresponds to memory 104 that is not backed by hardware included in hardware platform 102, but is simulated by secure monitor 190. Addresses in simulated region 320 are configured for access as devices—enforcing a strong ordering within CPU 103. As described in detail below, secure monitor 190 exploits the synchronization inherent in this strong ordering. Configuring addresses as devices may be accomplished in any technically feasible fashion that is consistent with the semantics of CPU 103, such as manipulating MMU mapping flags.

FIG. 3B depicts the processing of a non-secure instruction 325 that causes an external abort exception 335. Non-secure instruction 325 may be issued by any software executing on a processor, such as CPU 103, included in hardware platform 102. Upon receiving non-secure instruction 325, CPU 103 determines that the address associated with non-secure instruction 325 is not within device-backed region 310 and generates external abort exception 335 in non-secure mode 230. Hardware platform 102 then transitions to secure mode 232, and secure monitor 190 receives external abort exception 335.

Secure monitor 190 includes, without limitation, an address analyzer 392, an instruction decoder 395, and a simulation state machine 396. Address analyzer 392 determines whether the memory access that caused external abort exception 335 was to an address in simulated region 320. If address analyzer 392 determines that the address is not in simulated region 320, then secure monitor 190 generates a secure monitor response 350 indicating an error, hardware platform 102 returns to non-secure mode 230, and hypervisor/OS 114 completes appropriate abort behavior.

However, if address analyzer 392 determines that external abort exception 335 was caused by an access to an address included in simulated region 320, then instruction decoder 394 interprets non-secure instruction 325. Since simulated region 320 is configured as device memory 104, non-secure instruction 325, external abort exception 335, and the address accessed by non-secure instruction 325 are all in-sync with each other. In-sync means that the exception 355 occurs with the defaulting instruction pointer at the memory access instruction causing the exception 355. Instruction decoder 394 leverages this synchronization to accurately identify non-secure instruction 325. After instruction decoder 394 parses non-secure instruction 325, simulation state machine 396 performs one or more simulation operations that mimic the behavior expected of the appropriate physical device.

Simulation state machine 396 may include simulation functionality for any number of simulated devices. Further, secure monitor 190 may include any number of simulations state machines 396, each corresponding to a different simulated device. In alternate embodiments, simulation state machine 396 may be replaced with any combination of software, firmware, and/or hardware that reproduces any subset of device functionality. For example, simulation state machine 396 may be replaced with a bus functional model. Further, the functionality included in secure monitor 190 may be included in any number of software, firmware, and/or hardware units in any combination. In one embodiment, address analyzer 392, instruction decoder 394, and simulation state machine 396 are combined into a single piece of software.

Because the techniques disclosed herein decouple secure monitor 190 from hypervisor/OS 114, these techniques may reduce porting efforts for hypervisors/OSes 114 in future computer systems with unsupported or radically different devices 182 and models. In general, it should be recognized that the approaches disclosed herein are illustrative rather than restrictive, and may be altered without departing from the broader spirit and scope of the invention.

Figure 4:
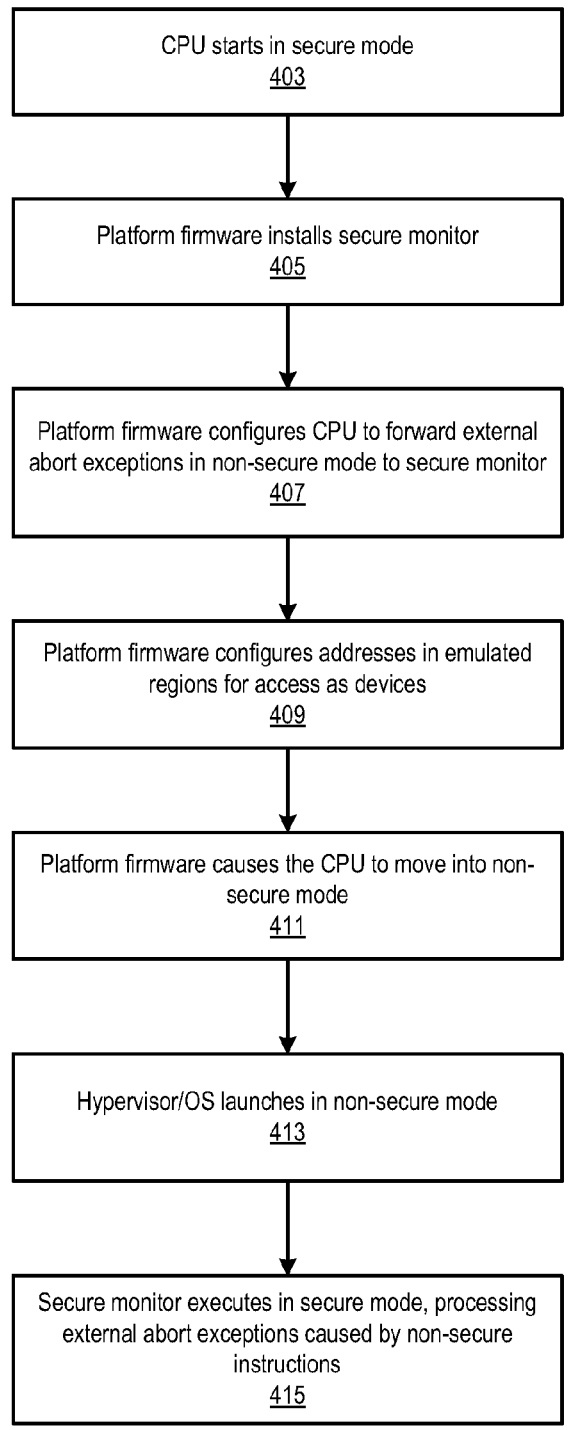
FIG. 4 depicts a flow diagram that illustrates a method that includes the steps of configuring device simulation in secure mode of hardware, according to an embodiment.

FIG. 4 depicts a flow diagram that illustrates a method that includes the steps of configuring device simulation in secure mode 232 of hardware, according to an embodiment. An exemplary computer system 100 that may implement this method includes an ARM® Cortex®-A57 (based on the ARM® v8 architecture) CPU 103 and a VMware® vSphere™ product hypervisor 114. As previously disclosed herein, ARM® Cortex®-A57 supports TrustZone security extensions that provide secure mode 232 for secure monitor 190 and non-secure mode 230 for non-secure components (e.g., hypervisor/OS 114).

This method begins at step 403, where CPU 103 starts (i.e., boots, initiates after reset, powers-up, etc.) in secure mode 232. In general, to minimize opportunities for illicit tampering of computer system 100, CPU 103 is designed to start in secure mode 232 and perform any secure boot protocols that protect computer system 100. At step 405, platform firmware 210 installs secure monitor 190. In some embodiments platform firmware 210 is included in hypervisor/OS 114. In other embodiments, platform firmware 210 installs both hypervisor/OS 114 and secure monitor 190. Further, in some embodiments, platform firmware 210 complies with a unified extensible firmware interface (UEFI).

At step 407, platform firmware 210 configures CPU 103 to forward external abort exceptions 335 generated in non-secure mode 230 to secure monitor 190 executing in secure mode 232. In operation, hardware platform 102 prohibits software executing in non-secure mode 230, such as hypervisor/OS 114, from responding to external abort exceptions 335 with device simulation operations. Advantageously, because secure monitor 190 executes in secure mode 232, hardware platform 102 permits secure monitor 190 to handle external abort exceptions 335 in a flexible manner, including performing device simulation operations in secure mode 232.

In general, platform firmware 210 may configure hardware platform 102 to forward external abort exceptions 335 in any technically feasible fashion that is consistent with the protocols established by the architecture of CPU 103. For instance, in some embodiments, platform firmware 210 clears external abort bit 212 included in secure configuration register 186. In this fashion, platform firmware 210 configures CPU 103 to transition to secure mode 232 upon encountering external abort exceptions 335. In conjunction, platform firmware 210 sets one or more exception vectors that cause CPU 103 execution to branch to the address of secure monitor 190 in response to external abort exceptions 335.

At step 409, platform firmware configures addresses in simulated region 320 for access as devices. Configuring addresses in simulated region 320 implies the strongest ordering available in CPU 103. This strong ordering ensures that attempted accesses to simulated region 320 in memory 104 generate external abort exceptions 335 that are synchronous with respect to non-secure instructions 325 associated with the attempted accesses. In particular, CPU 103 does not perform caching or buffering operations that may perturb the ordering of such accesses relative to non-secure instructions 325.

Simulated region 320 corresponds to addresses of "simulated" devices for which secure monitor 190 provides functionality. Memory 104 may include any number of simulated regions 320, each simulated region 320 may include any number of addresses corresponding to any number of simulated devices, and secure monitor 190 may provide functionality for any number of simulated devices. In general, platform firmware 210 configures memory 104 with simulated regions 320 that correspond to addresses for which secure monitor 190 is configured to provide constructive secure monitor responses 350, such as device simulation operations.

After platform firmware 210 finishes installing and configuring secure monitor 190, hypervisor/OS 114, and/or any initial security measures, platform hardware 210 causes CPU 103 to transition from secure mode 232 to non-secure mode 230 (step 411). As part of step 411, platform firmware 210 sets non-secure bit 214 included in secure configuration register 186 and relinquishes control to hypervisor/OS 114. At step 413, hypervisor/OS 114 launches in non-secure mode 230. At step 415, secure monitor 190 executes in secure mode 232. If hypervisor/OS 114 issues non-secure instruction 325 accessing memory 104 that is not backed by hardware platform 102, including simulated regions 320, then CPU 103 issues external abort exception 335. External abort exception 335 is forwarded to secure monitor 190 executing in secure mode 232—operating independently of hypervisor/OS 114. If the attempted access is to an address located within simulated region 320, then secure monitor 190 (executing in secure mode 232) performs simulation operations that mimic processing of non-secure instruction 325 by the appropriate device. Subsequently, secure monitor 190 returns control to hypervisor/OS 114 installed on top of hardware platform 102 (executing in non-secure mode 230), indicating successful execution of non-secure instruction 325.

Figure 5:
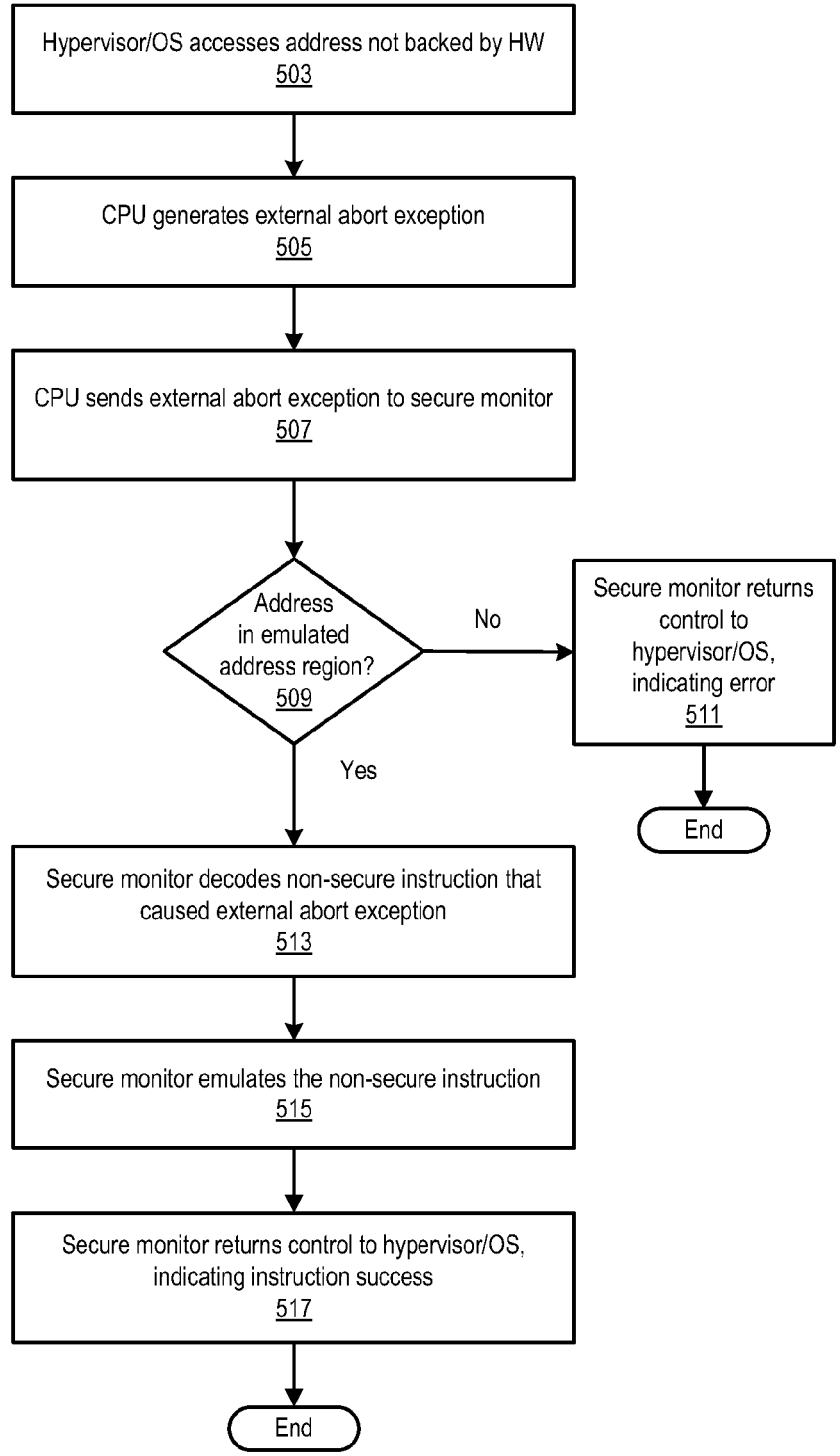
FIG. 5 depicts a flow diagram that illustrates a method that includes the steps of simulating devices that are not backed by hardware, according to an embodiment.

FIG. 5 depicts a flow diagram that illustrates a method that includes the steps of simulating devices that are not backed by hardware. In the embodiment illustrated herein, CPU 103 is configured to forward external abort exceptions 335 caused by non-secure instructions 325 to secure monitor 190. In a complementary fashion to the method detailed in FIG. 4, an exemplary computer system 100 that may implement this method includes an ARM® Cortex®-A57 (based on the ARM® v8 architecture) CPU 103 and hypervisor/OS 114. In general, prior to the execution of this method, CPU 103 is configured to forward external abort exceptions 335 caused by hypervisor/OS 114 executing on top of hardware platform 102 in non-secure mode 230 to secure monitor 190 executing in secure mode 232.

This method begins at step 503 where hypervisor/OS 114 attempts to access an address that is not backed by hardware platform 102. This attempt occurs as part of processing non-secure instruction 325 that addresses a portion of memory 104 that lies within unbacked region 315 or simulated region 320. At step 505, CPU 103 generates external abort exception 335. At step 507, CPU 103 forwards external abort exception 335 to secure monitor 190. As part of step 507, CPU 103 transitions from non-secure mode 230 to secure mode 232, clearing non-secure bit 214 included in secure configuration register 186.

After secure monitor 190 receives external abort exception 335 (step 509), address analyzer 392 performs one or more comparison operations to determine whether the address associated with external abort exception 335 is included in simulated region 320 of memory 104. Advantageously, external abort exception 335 is a synchronous exception and, as part of initializing computer system 100, addresses within simulated region 320 were configured for access as hardware devices. Consequently, computer system 100 does not execute operations, such as buffering and caching, that might cause non-secure instruction 325 and/or the address associated with non-secure instruction 325 to become out-of-sync with external abort exception 335.

Notably, memory 104 may include any number of simulated regions 320 and each simulated region 320 may be associated with a different simulated device. Further, address analyzer 392 may determine the address associated with external abort exception 335 using any technique as known in the art. In some embodiments, address analyzer 392 may partially or completely decode non-secure instruction 325 and perform one or more read operations on registers to ascertain the address associated with external abort exception 335.

If, at step 509, address analyzer 392 determines that the address associated with external abort exception 335 is not included in simulated region 320, then the method proceeds to step 511. At step 511, secure monitor 190 returns control to hypervisor/OS 114, indicating an error condition appropriate to external abort exception 335. As part of step 511, CPU 103 transitions from secure mode 232 to non-secure mode 230, setting non-secure bit 314 included in secure configuration register 186. In this fashion, secure monitor 190 handles external abort exceptions 335 associated with unbacked regions 315 of memory 104 both properly and transparently to hypervisor/OS 114. This method then ends.

At step 509, if address analyzer 392 determines that the address associated with external abort exception 335 is included in simulated region 320, then the method proceeds to step 513. At step 513, instruction decoder 394 decodes non-secure instruction 325 that caused external abort exception 335. In some embodiments, address analyzer 293 may perform step 513 as part of determining the address that caused external abort exception (step 509), and this method may skip step 513. Instruction decoder 394 may identify and decode non-secure instruction 325 in any technically feasible fashion. In alternate embodiments, the functionality included in address analyzer 392 and instruction decoder 394 may be combined or further subdivided into any number of units.

After decoding specific non-secure instruction 325 that caused external abort exception 335, simulation state machine 396 performs one or more finite state operations designed to mimic functionality of a physical device associated with non-secure instruction 325—generating secure monitor response 350 (step 515). For instance, suppose that non-secure instruction 325 were intended to transmit data to a 16550 universal asynchronous receiver/transmitter (UART) that is not included in computer system 100 but is simulated by secure monitor 190. In such a scenario, simulation state machine 396 would execute finite state machine operations to generate secure monitor response 350 that imitated the expected response of a physical 16550 UART.

After simulating non-secure instruction 325, at step 517, secure monitor 190 returns control to hypervisor/OS 114, indicating a successful execution of non-secure instruction 325 and, consequently, resolution of external abort exception 335. Notably, if non-secure instruction 325 involves a "read data from device" operation, then simulating non-secure instruction 325 also includes updating a retuned-to-CPU 103 register state. As part of step 517, CPU 103 transitions from secure mode 232 to non-secure mode 230, setting non-secure bit 314 included in secure configuration register 186. In this fashion, secure monitor 190 handles external abort exceptions 335 associated with simulated region 320 of memory 104 both properly and transparently to hypervisor/OS 114. Notably, secure monitor 190 may be configured to simulate any number of devices. This method then ends.

Although not shown in FIG. 5, after this method completes, hypervisor/OS 114 continues to process non-secure instructions 325. If hypervisor/OS 114 again attempts to access an address that is not backed by hardware platform 102, then this method is repeated. Further, similar flows may be used to provide functionality beyond simulating devices. For example, the disclosed approach enables modelling non-existing hardware interfaces, such as timers and bus topologies, and shimming away non-standard devices as compatible devices, such as presenting the proprietary ARM® PL011 UART as an industry standard NS1655 UART. In some embodiments, the techniques outlined herein facilitate tracing and debugging hypervisor device driver accesses to hardware platform 102.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless of the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of executing instructions to simulate an input/output device in a computer system having a hardware processor that is operable in both a secure mode and a non-secure mode, comprising:
   while the hardware processor operates in the non-secure mode:
   executing, by the hardware processor, a first instruction accessing a first memory address, the execution of the first instruction causing a transition of the hardware processor from operating in non-secure mode to operating in secure mode;
   while the hardware processor operates in the secure mode:
   analyzing, by hardware processor, the accessed memory address to determine whether or not the accessed memory address corresponds to an input/output device not backed by hardware;
   if the accessed memory address corresponds to the input/output device not backed by hardware, then:
   interpreting, by the hardware processor, the first instruction;
   executing, by the hardware processor, one or more instructions to simulate behavior of the input/output device based on the interpreted instruction; and
   returning to operating in non-secure mode with access to a result of executing the one or more instructions.

2. The method of claim 1,
   wherein the result indicates a successful processing of the first instruction.

3. The method of claim 1, further comprising:
   causing a transition of the processor to the secure mode by a second instruction, and in response thereto, executing the one or more secure operations to determine a second memory address accessed by the second instruction;
   determining that the second memory address is not included in a set of memory addresses corresponding to any input/output device; and
   returning to operating in a non-secure mode with a result indicating an error condition.

4. The method of claim 3, wherein the second memory address is not backed by any hardware in the computer system.

5. The method of claim 1, wherein execution of the first instruction causes an external abort exception.

6. The method of claim 1, wherein the one or more instructions simulating the behavior of the I/O device comprise finite state machine operations.

7. The method of claim 1, wherein the first memory address is included in a set of memory addresses.

8. The method of claim 1, wherein the first memory address is included in a set of memory addresses that comprise a consecutive range of memory addresses.

9. The method of claim 1, further comprising configuring the computer system to transition from the non-secure mode to the secure mode upon execution of the first instruction.

10. The method of claim 9, wherein execution of the first instruction causes an external abort exception and configuring the computer system to transition from the non-secure mode to the secure mode includes configuring the computer system to handle the external abort exception in the secure mode.

11. The method of claim 10, wherein configuring the computer system comprises setting one or more values included in a secure configuration register.

12. The method of claim 1, further comprising configuring a set of memory addresses for access as hardware devices.

13. The method of claim 12, wherein configuring the set of memory addresses for access as hardware devices comprises setting one or more values in one or more registers included in the computer system.

14. The method of claim 1, wherein the first memory address, and the first instruction are synchronous with respect to each other.

15. A non-transitory computer-readable storage medium comprising instructions, which when executed by a processor of a computer system operable in both a secure mode and a non-secure mode, causes the computer system to simulate an input/output device in the computer system by carrying out the steps of:
while the processor operates in the non-secure mode:
executing a first instruction accessing a first memory address, the execution of the first instruction causing a transition of the processor from operating in non-secure mode to operating in secure mode;
while the processor operates in the secure mode:
analyzing the accessed memory address to determine whether or not the accessed memory address corresponds to an input/output device not backed by hardware;
if the accessed memory address corresponds to the input/output device not backed by hardware, then:
interpreting the first instruction;
executing one or more instructions to simulate behavior of the input/output device based on the interpreted instruction; and
returning to operating in non-secure mode with access to a result of executing the one or more instructions.

16. The non-transitory computer-readable storage medium of claim 15, wherein execution of the first instruction causes an external abort exception.

17. A computer system comprising:
a hardware processor configured to execute at least one of an operating system and a hypervisor in a non-secure mode, wherein
while executing said at least one of an operating system and a hypervisor in non-secure mode, the hardware processor executes a first instruction accessing a first memory address, the execution of the first instruction causing a transition of the hardware processor from operating in non-secure mode to operating in secure mode; and
the hardware processor is further configured to execute a secure monitor that simulates an input/output device not backed by hardware in the secure mode by:
analyzing the accessed memory address to determine whether or not the accessed memory address corresponds to the input/output device;
if the accessed memory address corresponds to the input/output device, then:
interpreting the first instruction;
executing one or more instructions to simulate behavior of the input/output device based on the interpreted instruction; and
returning to operating in non-secure mode with access to a result of executing the one or more instructions.

* * * * *